United States Patent
Hayes

(10) Patent No.: US 6,834,056 B2
(45) Date of Patent: Dec. 21, 2004

(54) VIRTUAL LOCAL AREA NETWORK PROTECTION SWITCHING

(75) Inventor: Tim Hayes, Santa Barbara, CA (US)

(73) Assignee: OCCAM Networks, Santa Barbara, CA (US)

( * ) Notice: Subject to any disclaimer, the term of this patent is extended or adjusted under 35 U.S.C. 154(b) by 99 days.

(21) Appl. No.: 09/892,811

(22) Filed: Jun. 26, 2001

(65) Prior Publication Data
US 2002/0196735 A1 Dec. 26, 2002

(51) Int. Cl.$^7$ .............................................. H04L 12/40
(52) U.S. Cl. ........................................................ 370/440
(58) Field of Search ................................. 370/440, 395, 370/400–404, 254, 406, 412, 466, 235, 398, 390, 360, 230, 260, 429, 249, 392, 389, 911, 422–426; 709/249, 233, 224, 230, 251, 208; 395/200.81, 200.84

(56) References Cited

U.S. PATENT DOCUMENTS

| | | | |
|---|---|---|---|
| 5,537,411 A | 7/1996 | Plas | |
| 5,802,056 A * | 9/1998 | Ferguson et al. | ........... 370/403 |
| 5,903,370 A | 5/1999 | Johnson | |
| 5,999,288 A | 12/1999 | Ellinas et al. | |
| 6,088,141 A | 7/2000 | Merli et al. | |
| 6,163,527 A | 12/2000 | Ester et al. | |
| 6,226,111 B1 | 5/2001 | Chang et al. | |
| 6,233,619 B1 * | 5/2001 | Narisi et al. | ................ 709/230 |
| 6,243,177 B1 | 6/2001 | Duerksen | |
| 6,389,030 B1 * | 5/2002 | Coden | ........................ 370/404 |
| 6,414,958 B1 * | 7/2002 | Specht | ...................... 370/395 |
| 6,424,657 B1 * | 7/2002 | Voit et al. | .................... 370/412 |
| 6,445,715 B1 * | 9/2002 | Annaamalai et al. | ....... 370/466 |
| 6,510,141 B1 * | 1/2003 | Ramfelt et al. | ............. 370/254 |
| 6,556,541 B1 * | 4/2003 | Bare | ......................... 370/235 |
| 6,633,567 B1 * | 10/2003 | Brown | ....................... 370/395 |
| 6,658,015 B1 * | 12/2003 | Merchant et al. | ........... 370/422 |

OTHER PUBLICATIONS

PCT International Search Report, PCT/US02/18945, mailed Nov. 21, 2002, 7 Pages.

* cited by examiner

Primary Examiner—Kwang Bin Yao
Assistant Examiner—Prenell Jones
(74) Attorney, Agent, or Firm—Blakely Sokoloff Taylor & Zafman LLP

(57) ABSTRACT

A telecommunications system having segmented local ring networks is described. VLANs are used to segment the ring, constructing a logical non-ring topology providing each device on the ring with alternative paths for communication. The system provides failover (within 50 ms) and load sharing capabilities using groups of VLANS.

16 Claims, 2 Drawing Sheets

VIRTUAL LOCAL AREA NETWORK PROTECTION SWITCHING

FIELD OF THE INVENTION

This invention relates generally to telecommunications networks, and more specifically to the integration of voice and data transmissions over such networks.

BACKGROUND OF THE INVENTION

A typical telecommunications network is comprised of a central office (CO) and a connecting network called a local ring. The CO contains the necessary switching equipment and the local ring is the intermediate network between the CO and the end-user. The topology of the network is a ring structure. A local ring may be a fiber network that may typically employ the synchronous optical network (SONET) standard for transmitting digital information. SONET defines a hierarchy of interface rates for different fiber-optic transmission systems to allow data streams at different rates to be multiplexed. Employing the SONET standard makes it possible for communication carriers to interconnect existing digital carrier and fiber-optic systems.

FIG. 1 shows an example of a typical local ring. The telecommunications system 100, shown in FIG. 1, includes a CO 105. Each CO 105 has a number of local ring networks 110 connected to it. The number depends on the service area and the physical size of the CO and is typically less than a hundred. Local ring network 110 is a fiber-optic ring network connecting the CO to the end-user via remote terminals (RTs). Along the local ring network 110 are a plurality of RTs, for example RTs 115a, 115b, and 115c that are located throughout the service area. In a typical system there may be between ten and one hundred RTs connected to a given CO. The RTs contains circuitry that will span out copper wire 120 to the end-users in the vicinity of the RT.

The ring topology of the SONET based system 100 provides for fast failover in the event that the fiber-optic local ring network 110 experiences a failure (i.e., is unable to conduct data traffic). The local ring network 110 implements a dual counter-rotating ring so that if a break occurs in one ring the data traffic is shunted to the other ring. That is, the data flows in the other direction. For example, suppose data flows from RT 115b to CO 105 by way of RT 115a. If a break occurs in local ring network 110 between RT 115a and CO 105, data from RT 115b is directed to CO 105 by way of RT 115c. The SONET standard requires that this failover occur within 50 milliseconds (ms).

A SONET based network having ring topology presents several difficulties related to high speed data transfer as described below.

The ever-increasing importance of Internet access in our daily lives has led to increased emphasis on low-cost/high speed Internet connectivity.

Ethernet is one example of a technology that provides high-speed data access. Ethernet is a data transmission technology for local area networks (LANs). Ethernet may transmit data over a fiber-optic cable at rates up to one gigabit per second or higher. Ethernet transmission systems are LAN-based and transmit broadcast packets. On an Ethernet LAN, transmission points compete for the ability to use the shared network paths at a given time. If too many transmissions are attempted at one time the overall performance may be affected. To avoid this, an Ethernet network may be divided into segments with a device called a bridge connecting any two segments. Therefore, an Ethernet network should not operate on the ring topology of current SONET based networks. That is, the broadcast packets would continue around a ring.

A Digital Subscriber Line (DSL) is another technology that provides high-speed data access. The cost is low because DSL works on existing copper telephone wires obviating the need for costly installation of higher-grade cable. Signals from multiple DSL connections are sent to a DSL access multiplexer (DSLAM) for routing through a high-speed backbone (e.g., asynchronous transfer mode (ATM)). The DSLAM is typically located at the CO. Therefore, the farther the end-user is from the CO, the lower the speed due to the length of the copper wires. Eventually a point is reached (approximately 3 miles) where the CO cannot provide DSL service at all.

Current SONET systems do not support load sharing, the ability to shunt data traffic to another transmission path if congestion occurs or data transmission rate exceeds the maximum for a given transmission path.

SUMMARY OF THE INVENTION

A method is disclosed wherein a local ring telecommunications network is segmented using VLANs. At least two unique VLANs are used to partially traverse the ring forming two logically separate networks where each device on the ring has access to both VLANs. In the event of a break in the ring, devices failover to the alternate VLAN traversing the functional remnant of the ring. Load sharing also occurs between VLANs allowing each device an optimum path for traffic to traverse the ring. Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

A telecommunications system having segmented local ring networks is described. The system may employ Ethernet (e.g., gigabit Ethernet), or may employ other transmission means. The system optionally may employ wave division multiplexing (WDM) technology to provide multiple transmission channels. Virtual local area networks (VLANs) together with fault detection and fast failover algorithms are used. The configuration of the system provides load sharing capabilities while allowing packet transmission (e.g., Ethernet).

An intended advantage of the present invention is to allow local ring packetization, fast failover, and load sharing while maintaining compatibility with existing SONET, ATM, or other fiber-optic network protocols. Another intended advantage is to provide fast failover and load sharing across a VLAN. Another intended advantage is to provide fast failover and load sharing across a group of VLANs. Another intended advantage is to allow discrimination between voice and data transmissions. Another intended advantage is to provide increased access to DSL service.

Figure 1:
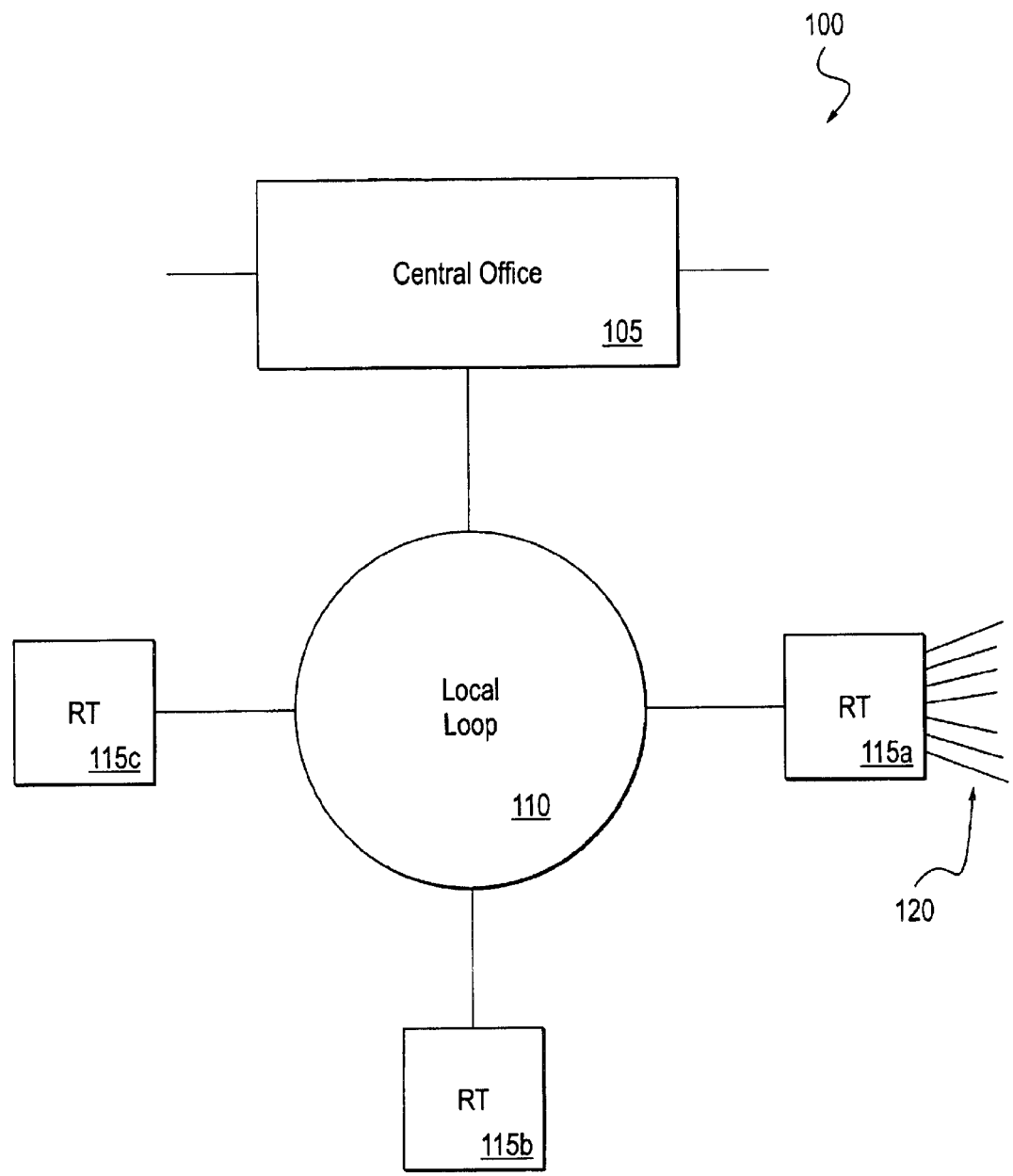
FIG. 1 is a block diagram of a SONET based telecommunications system according to the prior art.
Figure 2:
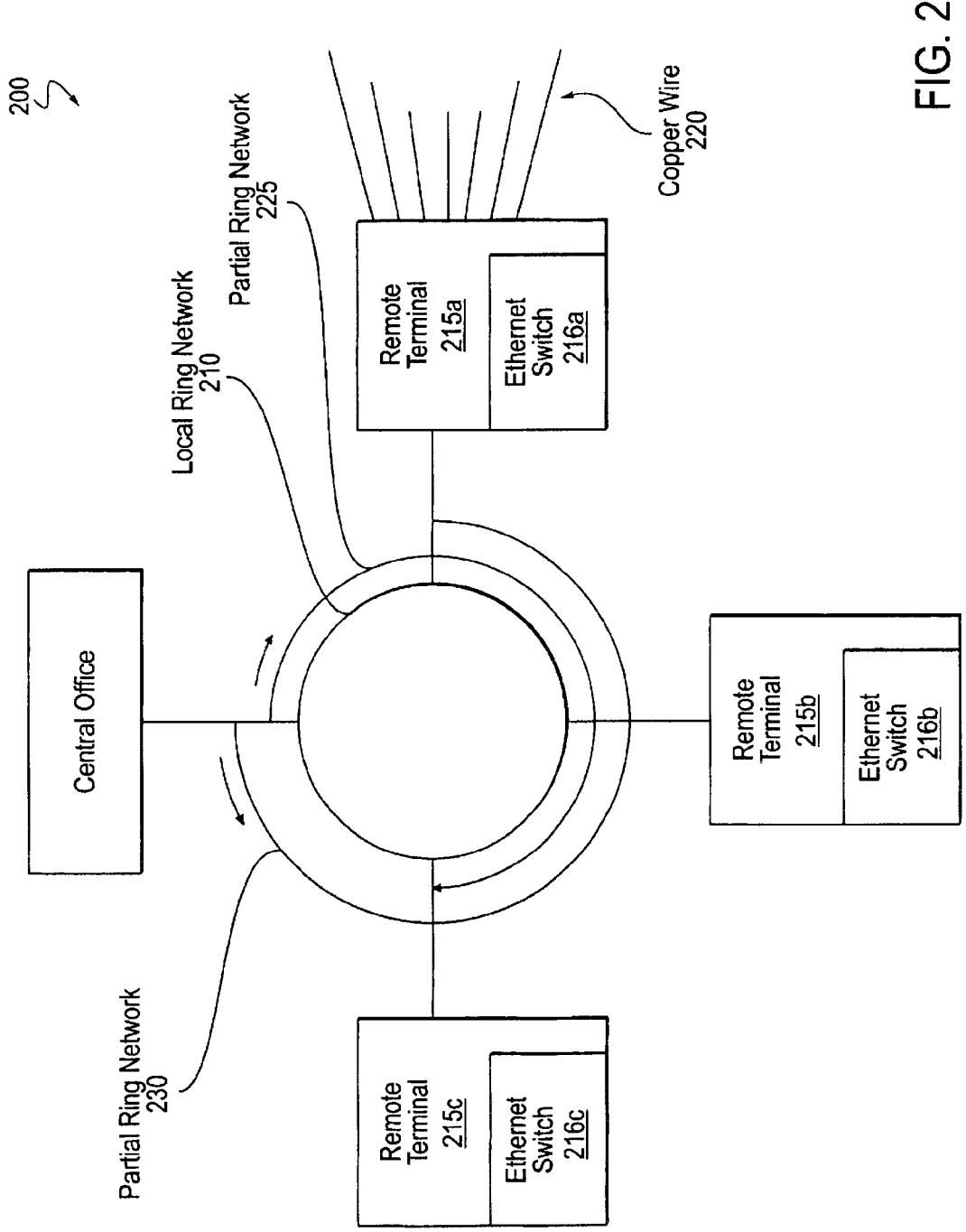
FIG. 2 is a block diagram of a telecommunications system in accordance with the present invention.

FIG. 2 is a block diagram of a telecommunications system in accordance with one embodiment of the present invention. The system 200, shown in FIG. 2, includes the same elements as telecommunications system 100, shown in FIG. 1. System 200 includes a CO 205 and remote terminals 215a, 215b, and 215c. Each remote terminal contains circuitry that will span out copper wire 220 to the end-users in the vicinity of the remote terminal. However, instead of one local ring network, system 200 may employ wave division multiplexing WDM, for example, to create three separate networks, local ring network 210, and networks 225, and 230.

WDM allows different data types, or channels, to be transmitted together on an optical fiber. Up to 80, and theoretically more, separate channels of data can be multiplexed into a lightstream transmitted on a single optical fiber. Each data type is carried on its own light wavelength (i.e., color band). A key advantage to WDM is that it is protocol and bit-rate independent. That is, since each channel is demultiplexed at the end point of the transmission, different data formats being transmitted at different rates can be transmitted together. For example, SONET data, ATM data, and Ethernet data can all be traveling at the same time within the optical fiber. In an alternative embodiment, WDM may not be employed.

Local ring network 210 of system 200 carries SONET data and so system 200 provides all of the capabilities of telecommunication network 100 (the SONET based system with ring topology). The existing telephone network may still operate as usual. In addition, other channels, provided by, for example, WDM, may be used to implement an Ethernet network. For example, networks 225 and 230 may be used to implement an Ethernet. In one embodiment of the present invention, the RTs 215a, 215b, and 215c may contain Ethernet switches 216a, 216b, and 216c, respectively. In an alternative embodiment, RTs 215a, 215b, and 215c may also contain DSL line cards and/or voice line cards. Although there is only one fiber optic cable, which forms a ring, networks 225 and 230 may be logically configured to form partial rings thus providing the structure needed to implement an Ethernet network.

As discussed above, Ethernet transmission systems are LAN-based and transmit broadcast packets. On an Ethernet LAN, transmission points compete for the ability to use the shared network paths at a given time. If too many transmissions are attempted at one time the overall performance may be affected. To avoid this, an Ethernet network may be divided into segments with a device called a bridge connecting any two segments.

Bridged Ethernet networks are required to be loop free unless using a protocol such as Spanning Tree Protocol (STP). STP is used to logically segment a physically looped Ethernet. STP can not be used in a network that must reliably carry voice traffic because the delay associated with correcting a fault in such a network must be held to under 50 milliseconds (ms). STP cannot typically reconfigure a network with a loop or fault within 50 ms (typically STP takes 2–3 seconds). Therefore, the VLAN protection switching of the present invention may be used as a replacement for STP.

Networks 225 and 230 may each be configured as a group of VLANs, with each VLAN within the group carrying a different data type. For example, network 225 may contain a voice VLAN, a DSL VLAN, a multimedia VLAN, a management VLAN, and other data VLANs. Network 230 may contain a corresponding group of VLANs. Network 200 allows load sharing because it retains the physical ring functionality. At the same time the ring topology of network 200 has been logically broken (i.e., segmented) for the purposes of Ethernet packet transmission.

Fast failover (FFO), according to the prior art, can be implemented on this system. A typical method is to send a signal, a "heartbeat" from the CO every 10 ms, for example. If the signal is not detected for a specified period, a failure is assumed and the traffic is switched. An embodiment of the present invention allows this same failover process to be implemented across two or more VLANs. Another embodiment allows failover between two or more groups of VLANs. For example, FFO Line cards within switches 216 may have voice interfaces, DSL interfaces, and other datatype interfaces. The line cards, at the interfaces, determine the VLAN over which the data traffic will go. So when there's a failure on network 225, for example, all of the line cards that were sending traffic over network 225 may become aware of the failure. The line cards may automatically switch their traffic to network 230.

The data may be switched from one group of VLANs to another, as discussed above, to implement FFO. Load sharing may also be accomplished between groups of VLANs in accordance with the present invention. Load sharing is typically done where there are multiple physical Ethernet connections on a switch. The traffic is then divided over the several connections. For example, if a network had two gigabit paths going to the CO and one was transmitting more than a gigabit and the other less. For efficiency it may be beneficial to share the traffic load. The present invention applies the concept of load sharing across groups of VLANs. A driver to the switching capability may be available to drive the change from one VLAN group to another. The data may also be switched to implement static or dynamic load sharing. In a typical system there may be dozens of nodes. Static load sharing may send traffic equally over network 225 and network 230 or assign the traffic based upon specified criteria, for example, how close a node is to the CO or the presence of high-traffic nodes between a given node and the CO. In an alternative embodiment load sharing may be accomplished dynamically through implementation of a load-sharing algorithm.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
   logically segmenting a telecommunications network having a ring topology into a number of channels, each channel configured as a group of virtual local area networks (VLANs) to create a traversable ring network; and
   switching traffic from a first one of the VLANs of a first one of the channels to a corresponding one of the VLANs of a second one of the channels.

2. The method of claim 1, wherein the switching is performed in response to detecting a failure of the first one of the VLANs of the first one of the channels.

3. The method of claim 2, wherein the failure is detected using a heartbeat signal transmitted from a node of the telecommunications network.

4. The method of claim 2, wherein the switching is performed within 50 msec of detecting the failure.

5. The method of claim 1, wherein the segmenting is accomplished using wave division multiplexing.

6. The method of claim 1, wherein the switching is performed to load balance traffic across the channels.

7. The method of claim 1, wherein each group of VLANs includes one or more of a voice VLAN, a DSL VLAN, a management VLAN, a multimedia VLAN, and a data VLAN.

8. The method of claim 1, wherein the channels include some or all of an IP channel, a SONET channel, an ATM channel, an SDH channel, a DSL channel, a voice channel, and an Ethernet channel.

9. A telecommunications network, comprising:
   logically segmented channels, each configured as a group of virtual local area networks (VLANs), overlaid on a physical ring network topology to create a traversable ring network; and
   means for switching traffic from a first one of the VLANs of a first one of the channels to a corresponding one of the VLANs of a second one of the channels.

10. The network of claim 9, wherein the means for switching traffic is operative in response to detecting a failure of the first one of the VLANs of the first one of the channels.

11. The network of claim 10, wherein the failure is detected using a heartbeat signal transmitted from a node of the telecommunications network.

12. The network of claim 10, wherein the means for switching is configured to switch the traffic within 50 msec of detecting the failure.

13. The network of claim 9, wherein the channels are logically segmented using wave division multiplexing.

14. The network of claim 9, wherein the means for switching is operative to load balance traffic across the channels.

15. The network of claim 9, wherein each group of VLANs includes one or more of a voice VLAN, a DSL VLAN, a management VLAN, a multimedia VLAN, and a data VLAN.

16. The network of claim 9, wherein the channels include some or all of an IP channel, a SONET channel, an ATM channel, an SDH channel, a DSL channel, a voice channel, and an Ethernet channel.

* * * * *